(12) United States Patent  
Choi et al.

(10) Patent No.: US 9,414,372 B2  
(45) Date of Patent: Aug. 9, 2016

(54) DIGITAL FILTER CONTROL FOR FILTER TRACKING SPEEDUP

(71) Applicant: QUALCOMM Incorporated, San Diego, CA (US)

(72) Inventors: Jun Won Choi, San Diego, CA (US); Huilin Xu, San Diego, CA (US); Raghu Narayan Challa, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 436 days.

(21) Appl. No.: 13/797,907

(22) Filed: Mar. 12, 2013

(65) Prior Publication Data

US 2013/0242820 A1    Sep. 19, 2013

Related U.S. Application Data

(60) Provisional application No. 61/611,770, filed on Mar. 16, 2012.

(51) Int. Cl.
*H04W 72/04* (2009.01)
*H04L 27/00* (2006.01)
*H04L 27/26* (2006.01)

(52) U.S. Cl.
CPC ......... *H04W 72/042* (2013.01); *H04L 27/0014* (2013.01); *H04L 27/2657* (2013.01); *H04L 27/2685* (2013.01); *H04L 2027/0024* (2013.01); *H04L 2027/0053* (2013.01); *H04L 2027/0069* (2013.01)

(58) Field of Classification Search
CPC ............... H04L 2025/0349; H04L 2025/0342; H04L 2025/03382; H04L 25/03057; H03H 21/0012; H04N 5/211; H04N 5/4401
See application file for complete search history.

(56) References Cited

U.S. PATENT DOCUMENTS

| | | | | |
|---|---|---|---|---|
| 5,058,047 A * | 10/1991 | Chung | ........................... | 708/322 |
| 5,243,624 A * | 9/1993 | Paik et al. | ..................... | 375/232 |
| 5,838,599 A * | 11/1998 | Tao et al. | ....................... | 708/304 |
| 8,073,497 B2 * | 12/2011 | Fratila | ........................... | 455/570 |
| 8,200,499 B2 * | 6/2012 | Nongpiur et al. | ............. | 704/500 |
| 2001/0043650 A1 * | 11/2001 | Sommer et al. | ................ | 375/232 |
| 2002/0086707 A1 * | 7/2002 | Struhsaker et al. | ........... | 455/561 |
| 2003/0012273 A1 * | 1/2003 | Farrow | ........................... | 375/232 |
| 2003/0081668 A1 * | 5/2003 | Yousef et al. | ................. | 375/232 |
| 2003/0181183 A1 * | 9/2003 | Ventura | ........................ | 455/258 |
| 2006/0068732 A1 * | 3/2006 | Jin | .............................. | 455/232.1 |

(Continued)

FOREIGN PATENT DOCUMENTS

CN          101107826 A       1/2008
CN          102264091 A       11/2011

OTHER PUBLICATIONS

International Search Report and Written Opinion—PCT/US2013/031028—ISA/EPO—Jun. 21, 2013.

(Continued)

*Primary Examiner* — Jung-Jen Liu
(74) *Attorney, Agent, or Firm* — Seyfarth Shaw LLP

(57) ABSTRACT

A method for speeding up a filter tracking speed includes scaling filter coefficients based at least in part on an uplink/downlink configuration in a time division duplex (TDD) or a multimedia broadcast single frequency network (MBSFN) system. The method also includes applying scaled filter coefficients during at least one downlink subframe to control a filter tracking speed.

18 Claims, 13 Drawing Sheets

(56) References Cited

U.S. PATENT DOCUMENTS

| | | |
|---|---|---|
| 2008/0225758 A1* | 9/2008 | Proctor et al. ............... 370/279 |
| 2010/0080163 A1 | 4/2010 | Krishnamoorthi et al. |
| 2011/0111718 A1* | 5/2011 | Canpolat et al. ............ 455/255 |
| 2011/0142151 A1* | 6/2011 | Zhang et al. ................. 375/260 |
| 2011/0158342 A1* | 6/2011 | Srinivasan et al. ........... 375/285 |
| 2012/0027140 A1* | 2/2012 | Weng et al. .................. 375/350 |
| 2012/0100800 A1* | 4/2012 | Jayasimha et al. ........... 455/13.4 |
| 2012/0140917 A1* | 6/2012 | Nicholson et al. ...... 379/392.01 |
| 2013/0044651 A1* | 2/2013 | Wang et al. .................. 370/280 |
| 2013/0215935 A1* | 8/2013 | Nuzman et al. ............... 375/219 |
| 2014/0056393 A1* | 2/2014 | Xu ................................. 375/343 |

OTHER PUBLICATIONS

Taiwan Search Report—TW102108912—TIPO—Nov. 20, 2014.

"Self-FEXT Cancellation (Vectoring) for use with VDSL2 Transceivers," Series G: Transmission Systems and Media, Digital Systems and Networks, ITU G.993.5, Apr. 2010, 80 pages.

* cited by examiner

DIGITAL FILTER CONTROL FOR FILTER TRACKING SPEEDUP

CROSS-REFERENCE TO RELATED APPLICATION

The present application claims the benefit of U.S. Provisional Patent Application No. 61/611,770 filed on Mar. 16, 2012, entitled DIGITAL FILTER CONTROL FOR FILTER TRACKING SPEED UP, which is expressly incorporated by reference herein in its entirety.

BACKGROUND

1. Field

Aspects of the present disclosure relate generally to wireless communication systems, and more particularly to speeding up a filter tracking speed.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

As the demand for mobile broadband access continues to increase, the possibilities of interference and congested networks grows with more UEs accessing the long-range wireless communication networks and more short-range wireless systems being deployed in communities. Research and development continue to advance Universal Mobile Telecommunication System (UMTS) technologies not only to meet the growing demand for mobile broadband access, but to advance and enhance the user experience with mobile communications.

SUMMARY

According to one aspect of the present disclosure, a method for speeding up a filter tracking speed is described. The method includes scaling filter coefficients based at least in part on an uplink/downlink configuration in a time division duplex (TDD) or a multimedia broadcast single frequency network (MBSFN) system. The method also includes applying scaled filter coefficients during at least one downlink subframe to control a filter tracking speed.

According to another aspect of the present disclosure, an apparatus for operation in a wireless communication network is described. The apparatus includes a memory and at least one processor that is coupled to the memory. The processor(s) is configured to scale filter coefficients based at least in part on an uplink/downlink configuration in a time division duplex (TDD) or a multimedia broadcast single frequency network (MBSFN) system. The processor(s) is also configured to apply the filter coefficients during at least one downlink subframe to control a tracking loop speed.

According to a further aspect of the disclosure, a computer program product for wireless communication is described. The computer program product includes a non-transitory computer-readable medium having program code recorded thereon. The non-transitory computer-readable medium includes program code to scale filter coefficients based at least in part on an uplink/downlink configuration in a time division duplex (TDD) or a multimedia broadcast single frequency network (MBSFN) system. The non-transitory computer-readable medium also includes program code to apply the filter coefficients during at least one downlink subframe to control a tracking loop speed.

Another aspect of the present disclosure includes an apparatus that operates in a wireless communication system. The apparatus includes a means for scaling filter coefficients based at least in part on an uplink/downlink configuration in a time division duplex (TDD) or a multimedia broadcast single frequency network (MBSFN) system. The apparatus also includes a means for applying scaled filter coefficients during at least one downlink subframe to control a tracking loop speed.

This has outlined, rather broadly, the features and technical advantages of the present disclosure in order that the detailed description that follows may be better understood. Additional features and advantages of the disclosure are described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using hardware (e.g., electronic hardware), software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Figure 1:
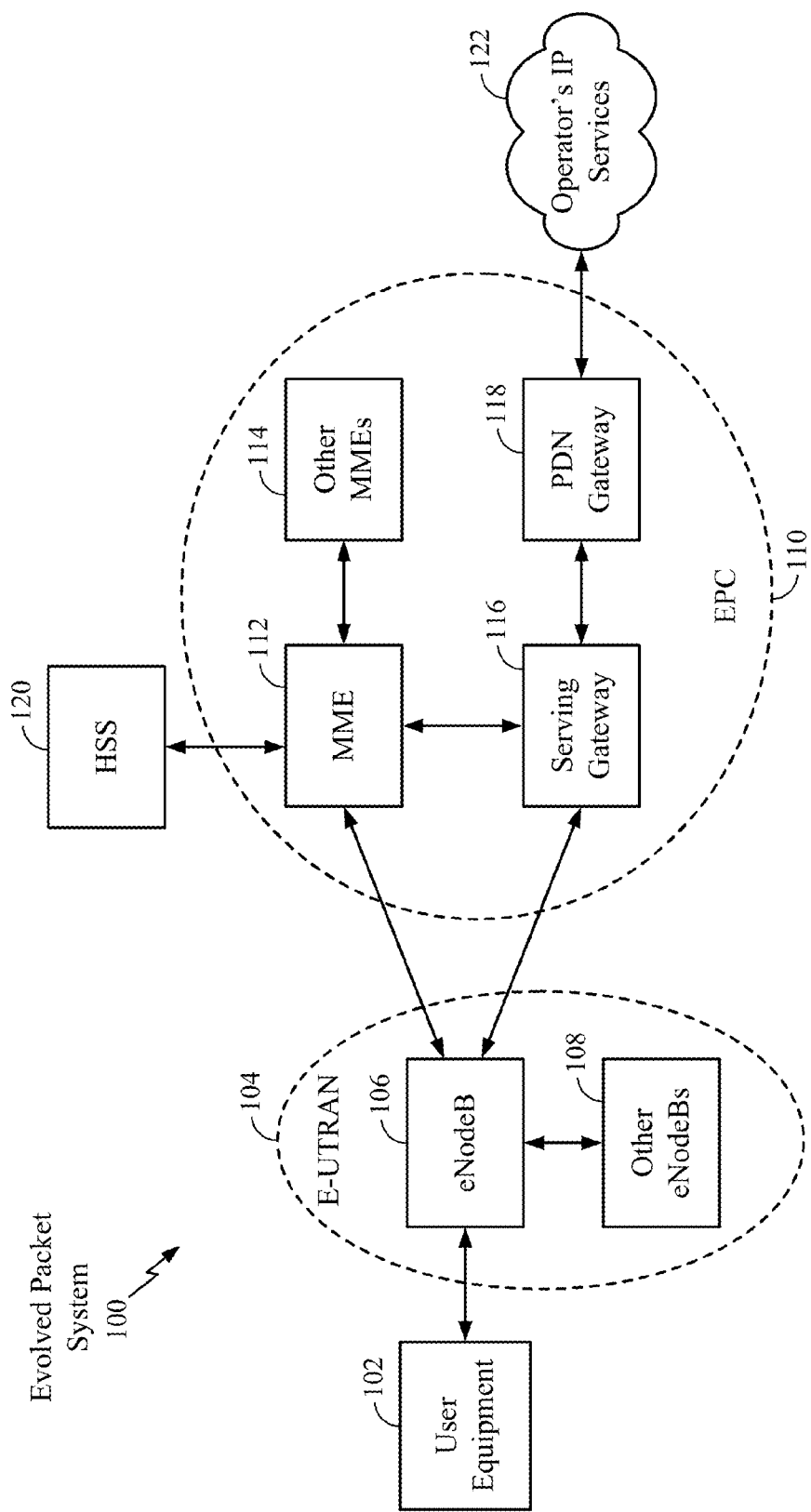
FIG. 1 is a diagram illustrating an example of a network architecture.

For clarity, certain aspects of the techniques are described for LTE or LTE-Advanced (LTE-A) (together referred to as "LTE") and use such LTE terminology in much of the description below. FIG. 1 is a diagram illustrating an LTE network architecture 100, in which speeding up a filter tracking speed may be implemented according to aspects of the present disclosure. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS 100 can interconnect with other access networks, but for simplicity, those entities/interfaces are not shown. As shown, the EPS 100 provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, an access point, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a tablet, a netbook, a smartbook, an ultrabook, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS (packet-switched) Streaming Service (PSS).

Figure 2:
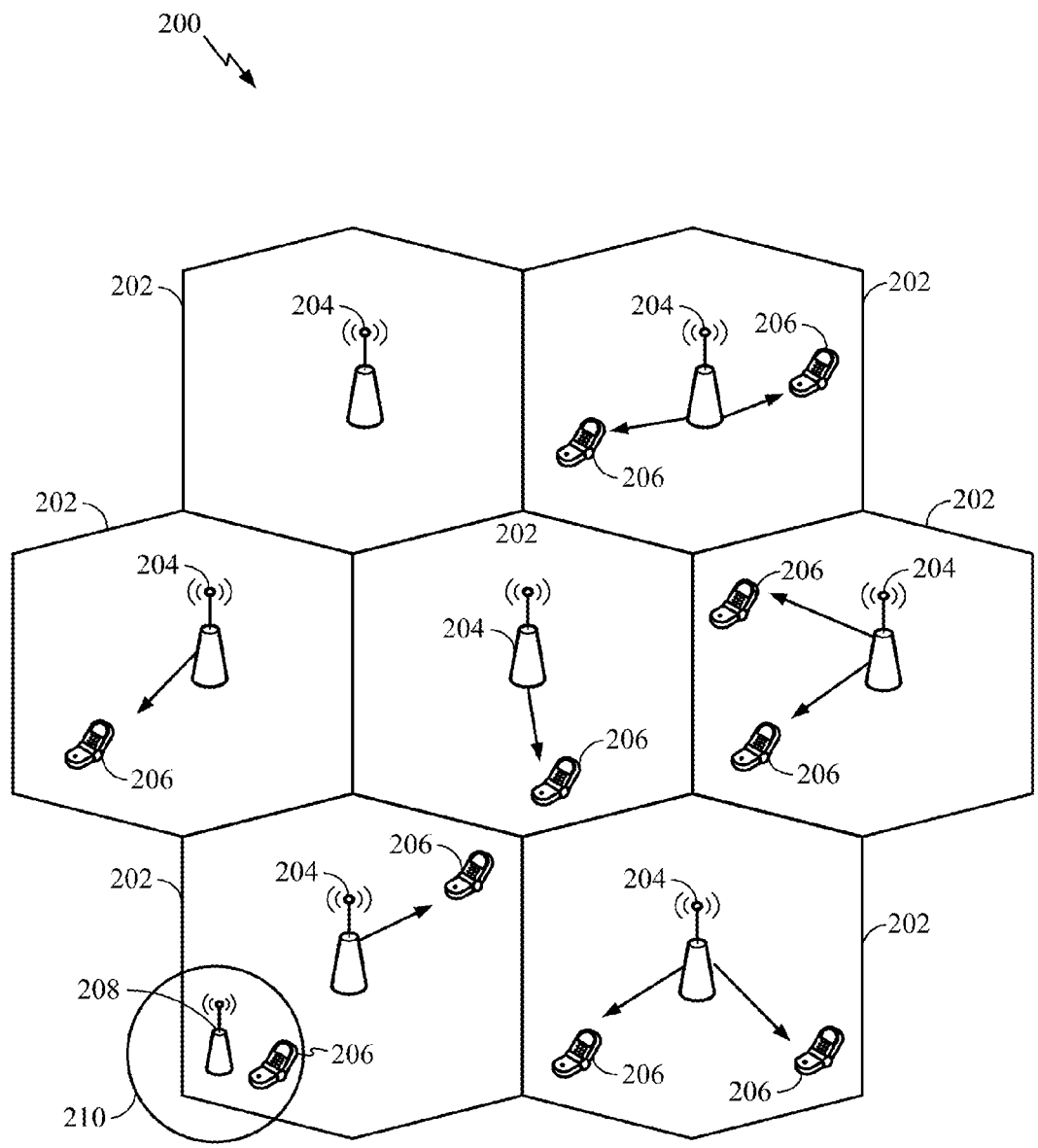
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. The lower power class eNodeB 208 may be a remote radio head (RRH), a femto cell (e.g., home eNodeB (HeNodeB)), pico cell, or micro cell. The macro eNodeBs 204 are each assigned to a respective one of the cells 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the $3^{rd}$ Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeBs 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
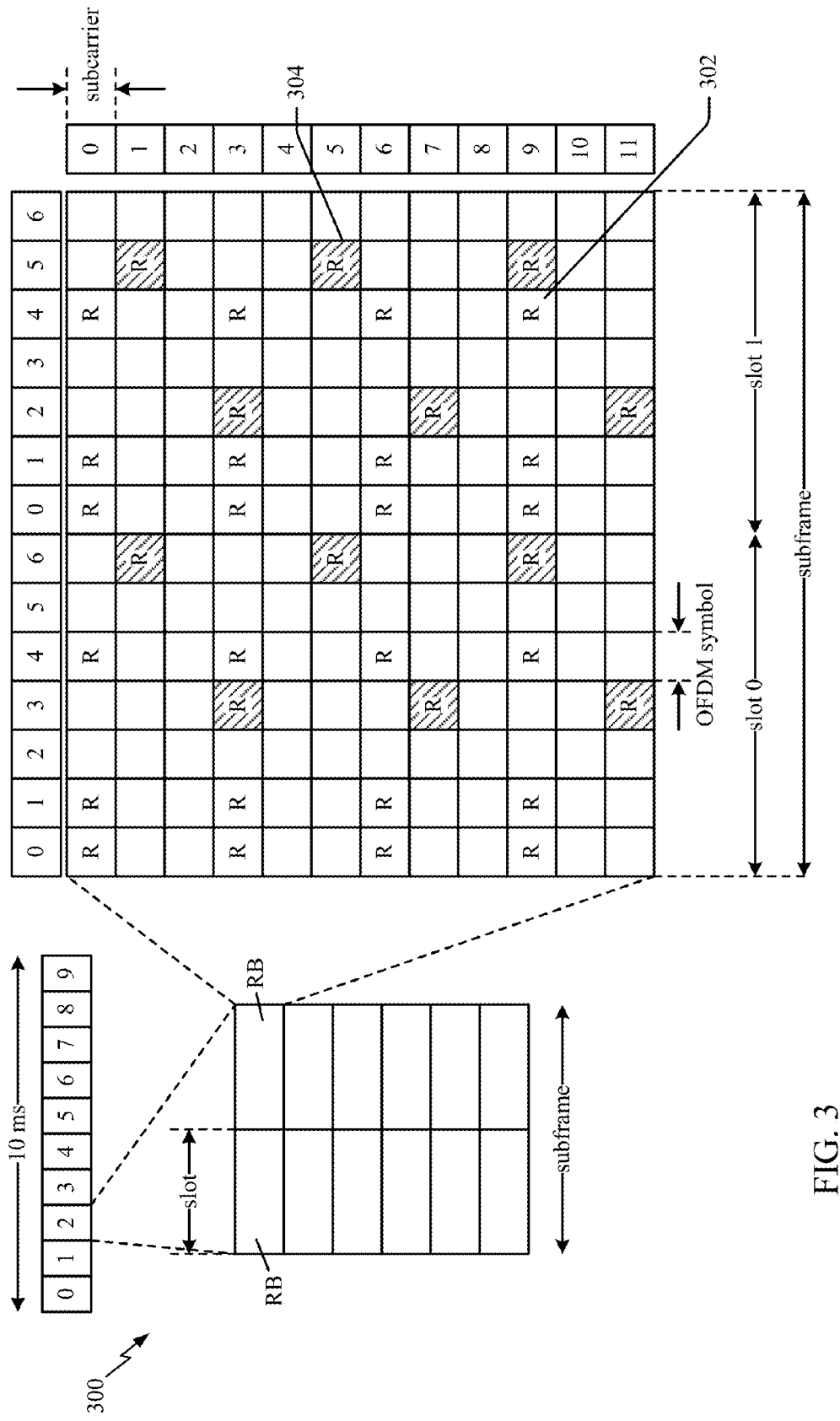
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized subframes. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
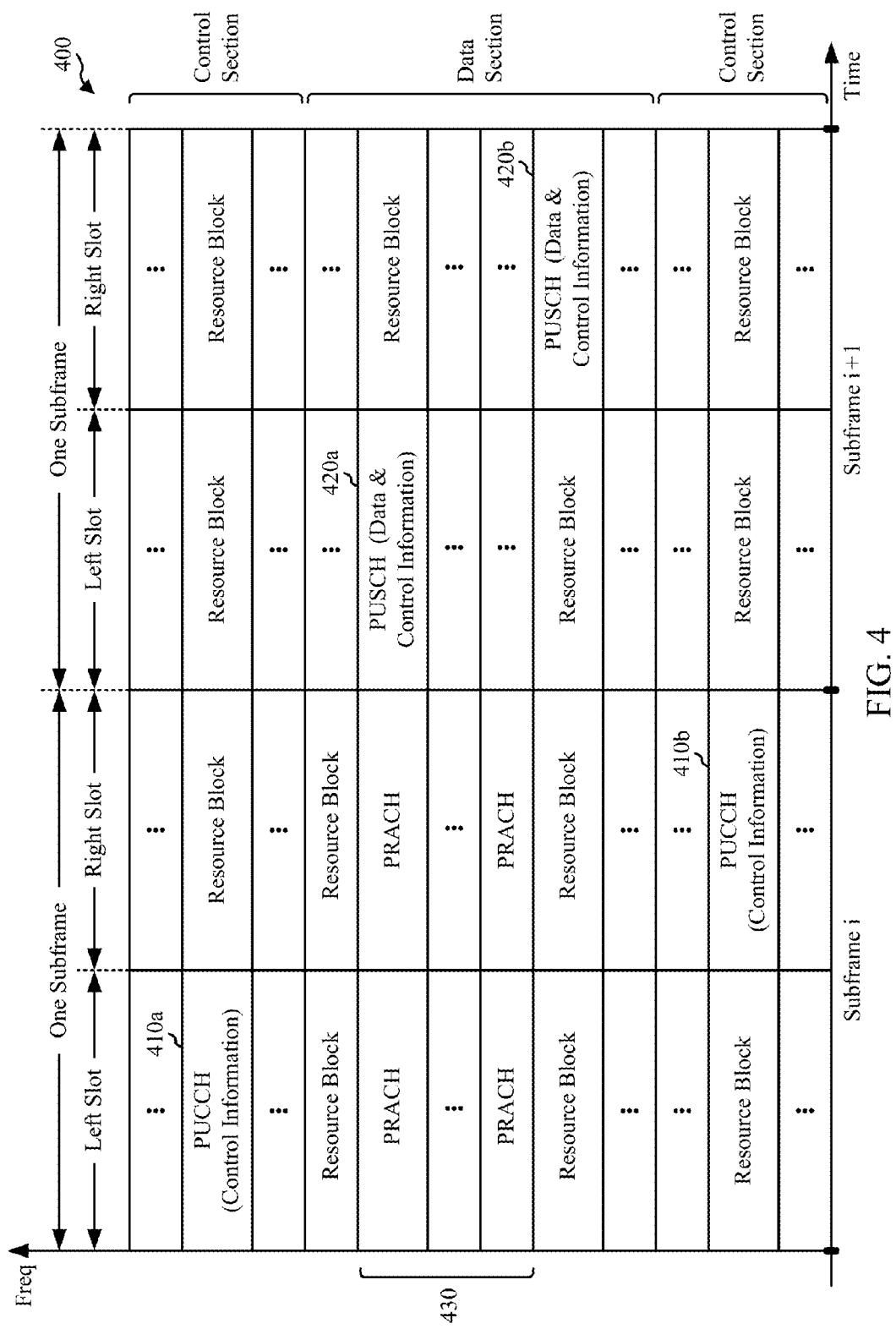
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
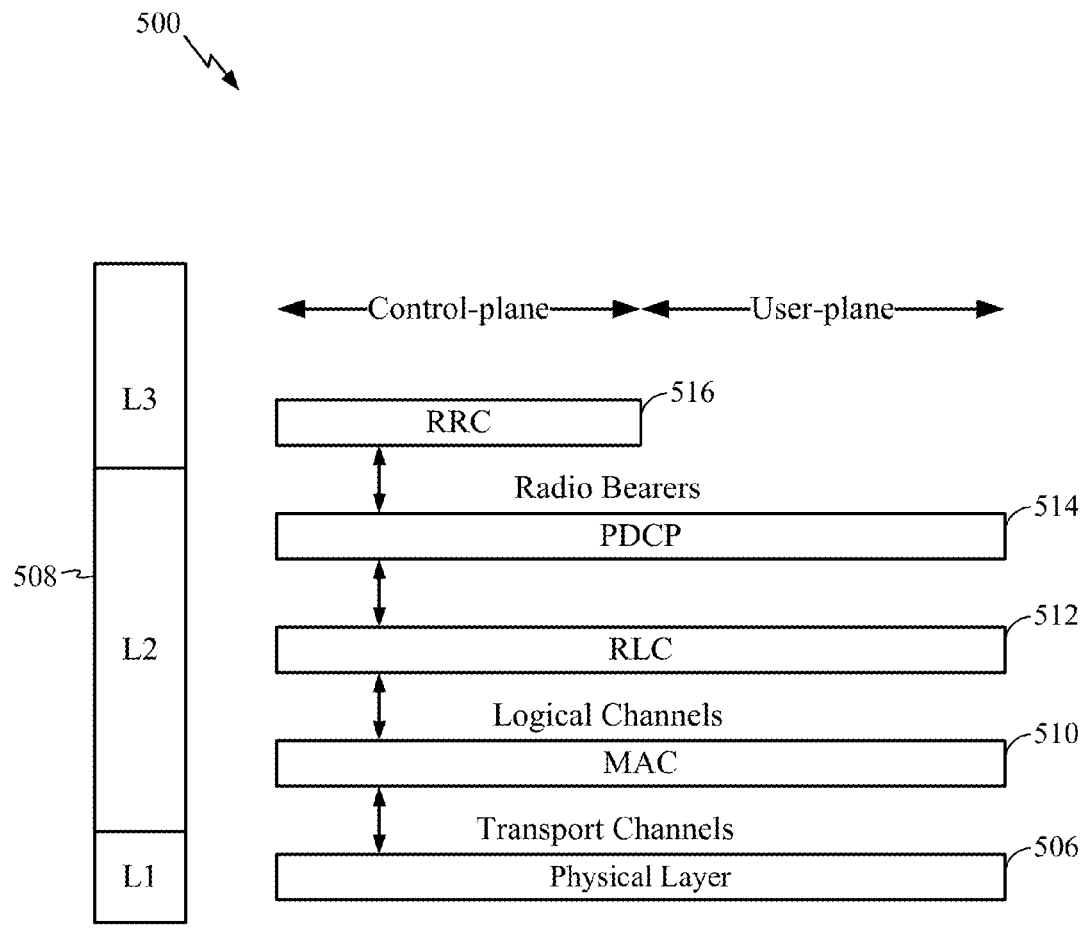
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
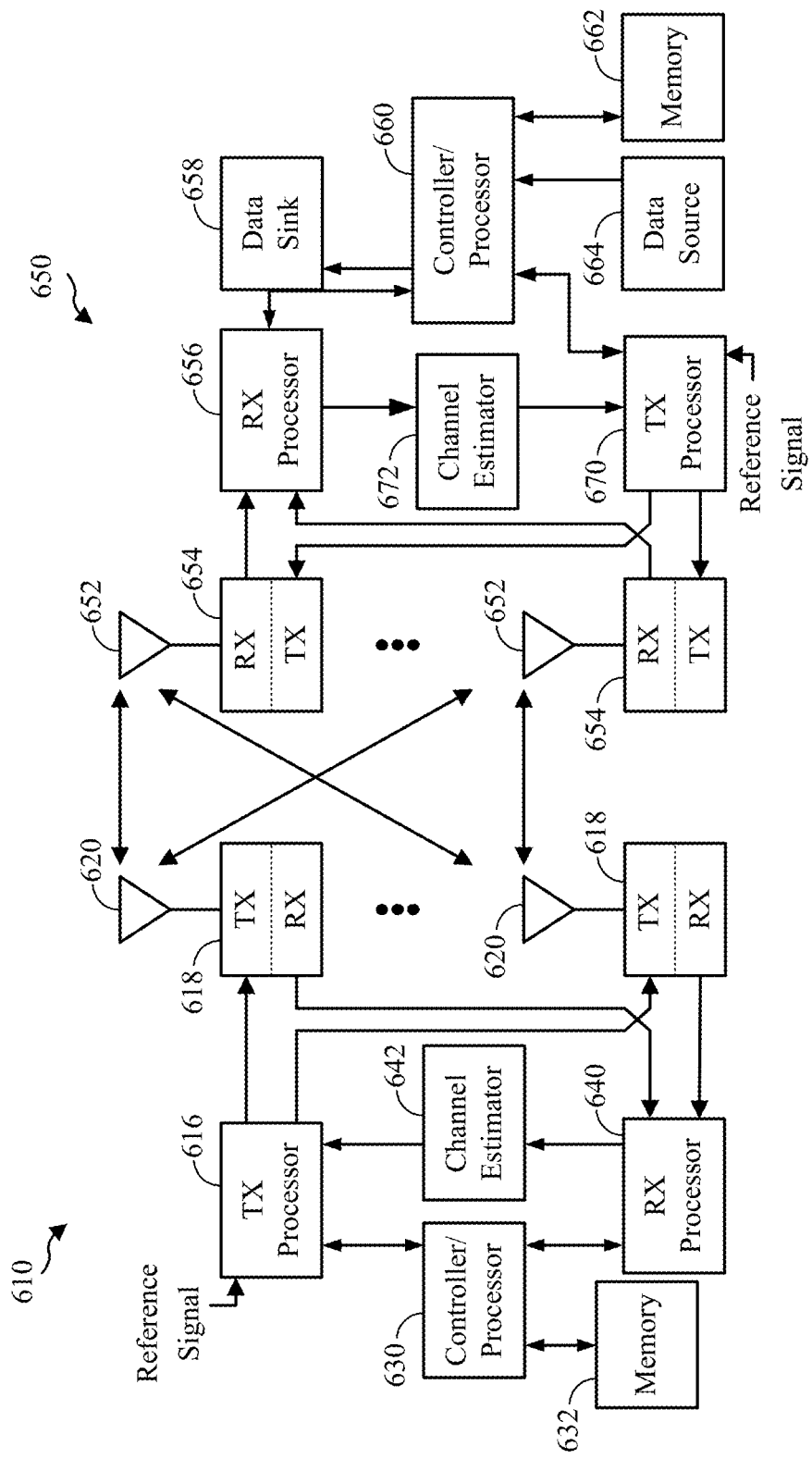
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor of the eNodeB 610. The controller/processor 630 implements, e.g., the functionality of the L2 layer. In the downlink, the controller/processor 630 provides header compression, ciphering, packet segmentation and reordering, multiplexing between logical and transport channels, and radio resource allocations to the UE 650 based on various priority metrics. The controller/processor 630 is also responsible for HARQ operations, retransmission of lost packets, and signaling to the UE 650.

The transmit processor 616 of the eNodeB 610 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 642 may be used to determine the coding and modulation scheme, as well as for spatial processing. The channel estimate may be derived from a reference signal or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each of the receivers 654RX receives a signal through its respective antenna 652. Each of the receivers 654RX recovers information modulated onto an RF carrier and provides the information to the receiver (RX) processor 656. The receive processor 656 implements various signal processing functions of the L1 layer. The receive processor 656 performs spatial processing on the information to recover any spatial streams destined for the UE 650. If multiple spatial streams are destined for the UE 650, they may be combined by the receive processor 656 into a single OFDM symbol stream. The receive processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 672. The soft decisions are then decoded and deinterleaved to recover the data and control signals that were originally transmitted by the eNodeB 610 on the physical channel. The data and control signals are then provided to the controller/processor 660 of the UE 650.

The controller/processor 660 implements, e.g., the L2 layer. The controller/processor 660 can be associated with a memory 662 that stores program codes and data. The memory 662 may be referred to as a computer-readable medium. In the uplink, the controller/processor 660 provides demultiplexing between transport and logical channels, packet reassembly, deciphering, header decompression, control signal processing to recover upper layer packets from the core network. The upper layer packets are then provided to a data sink 658, which represents all the protocol layers above the L2 layer. Various control signals may also be provided to the data sink 658 for L3 processing. The controller/processor 660 is also responsible for error detection using an acknowledgement (ACK) or negative acknowledgement (NACK) protocol to support HARQ operations.

In the uplink, a data source 664 is used to provide upper layer packets to the controller/processor 660. The data source 664 represents all protocol layers above the L2 layer. Similar to the functionality described in connection with the downlink transmission by the eNodeB 610, the controller/processor 660 implements the L2 layer for the user plane and the control plane by providing header compression, ciphering, packet segmentation and reordering, and multiplexing between logical and transport channels based on radio resource allocations by the eNodeB 610. The controller/processor 660 is also responsible for HARQ operations, retransmission of lost packets, and signaling to the eNodeB 610.

Channel estimates derived by a channel estimator 672 from a reference signal or feedback transmitted by the eNodeB 610 may be used by the transmit processor 670 to select the appropriate coding and modulation schemes, and to facilitate spatial processing. The spatial streams generated by the transmit processor 670 are provided to different antenna 652 via separate transmitters 654TX. Each of the transmitters 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a receive processor 640. The receive processor 640 of the eNodeB may implement the L1 layer.

The controller/processor 630 implements the L2 layer. The controller/processor 630 can be associated with a memory 632 that stores program codes and data. The memory 632 may be referred to as a computer-readable medium. In the uplink, the controller/processor 630 provides demultiplexing between transport and logical channels, packet reassembly, deciphering, header decompression, control signal processing to recover upper layer packets from the UE 650. Upper layer packets from the controller/processor 630 may be provided to the core network. The controller/processor 630 is also responsible for error detection using an ACK or NACK protocol to support HARQ operations.

The controller/processor 630 and the controller/processor 660 may direct the operation at the eNodeB 610 and the UE 650, respectively. The controller/processor 630 or other processors and modules at the eNodeB 610 may perform or direct the execution of various processes for the techniques described herein. The controller/processor 660 or other processors and modules at the UE 650 may also perform or direct the execution of the functional blocks illustrated in the flow chart of FIG. 15, or other processes for the techniques described herein. The memory 632 and the memory 662 may store data and program codes for the eNodeB 610 and the UE 650, respectively.

In UE receivers, digital filters are used for various purposes such as frequency tracking loops (FTL), time tracking loops (TTL), automatic gain control (AGC) loops and channel estimators. Infinite impulse response (IIR) filters are frequently used as digital filters. IIR filters in frequency tracking loops (FTL), time tracking loops (TTL), automatic gain control (AGC) loops, and channel estimators compensate for frequency offset and timing drift before signal demodulation in the UE receiver. IIR filters may be implemented as first or second order pole IIR systems for dampening instantaneous changes of input samples (e.g., frequency/timing offset estimates, power estimates, and channel estimates). IIR filters can also average noise/jitter out from noisy estimates by combining the estimates in time.

The coefficients of IIR filters determine how rapidly the output of an IIR filter reacts to the input changes. The coefficients of IIR filters may include but are not limited to loop gains for frequency tracking loops (FTL), time tracking loops (TTL), automatic gain control (AGC), channel estimators, and the like.

In operation, IIR filters may, e.g., smooth out the rapid change of instantaneous estimates of frequency offset, timing offset, power, and channel estimates. The IIR filters may also suppress out-of-band noise and jitter from the output of the tracking loop. Hence, the loop gains (e.g., filter coefficients) may be determined by statistics of instantaneous estimates and signal to noise (jitter) ratio.

One aspect of the disclosure relates to a frequency/timing tracking loop speedup for an LTE multimedia broadcast single frequency network (MBSFN) or a TDD (time division duplex) system. In LTE-TDD or MBSFN systems, filter coefficients (e.g., loop gains) may not be updated during non-downlink subframes to avoid non-downlink data from being used for the filter coefficient update. Due to the frozen update for non-downlink subframes, the filter tracking speed slows down as compared to the case where the filter coefficients are updated in every subframe (e.g., FDD (frequency division duplex) and non-MBSFN mode). In one aspect of the disclosure, a filter tracking speedup compensates for the frozen filter coefficients update by adjusting the tracking loop coefficients appropriately.

In one configuration, a filter tracking speed is compensated by increasing the filter coefficients for all downlink subframes by a ratio of the total number of subframes to the total number of downlink subframes in one radio frame. In a further configuration, the filter tracking speed is compensated by increasing the filter coefficients for the uplink to downlink ("transitional") subframe by the number of consecutive non-downlink subframes before the transitional downlink subframe. Compensation of a filter tracking speed may be incorporated in any tracking loop used in an LTE-TDD or an MBSFN system. In one aspect of the disclosure, compensation of the filter tracking speed may effectively speed up the filter tracking speed consistent with an FDD and a non-MBSFN configuration, in which filter coefficients are updated every subframe.

Figure 7:
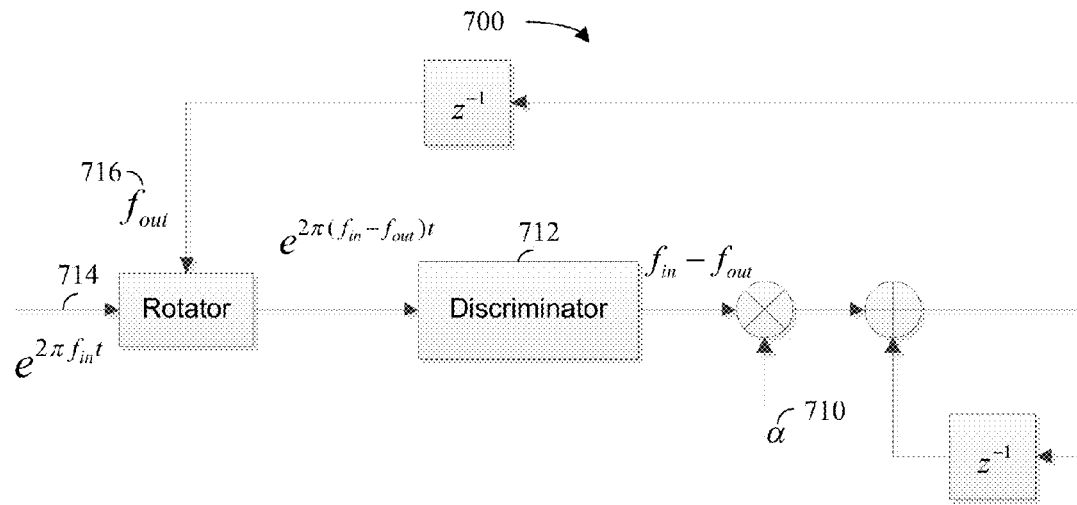
FIG. 7 is a block diagram illustrating a frequency tracking loop according to a first order configuration.

FIG. 7 is a block diagram illustrating a frequency tracking loop 700 according to a first order configuration. Representatively, a discriminator 712 outputs an instantaneous estimate of a frequency offset $f_{in}-f_{out}$. A tracking loop speed of the frequency tracking loop 700 is determined by a time constant:

$$1-\alpha \qquad (1)$$

where $\alpha$ is a loop gain 710 of the frequency tracking loop 700; a transfer function from $f_{in}$ 714 to $f_{out}$ 716 is:

$$f_{out} = \frac{\alpha z^{-1}}{1-(1-\alpha)z^{-1}} f_{in} \quad (2)$$

and a time domain impulse response of the frequency tracking loop 700 is:

$$h[n] = \alpha(1-\alpha)^{n-1} \quad (3)$$

Figure 8:
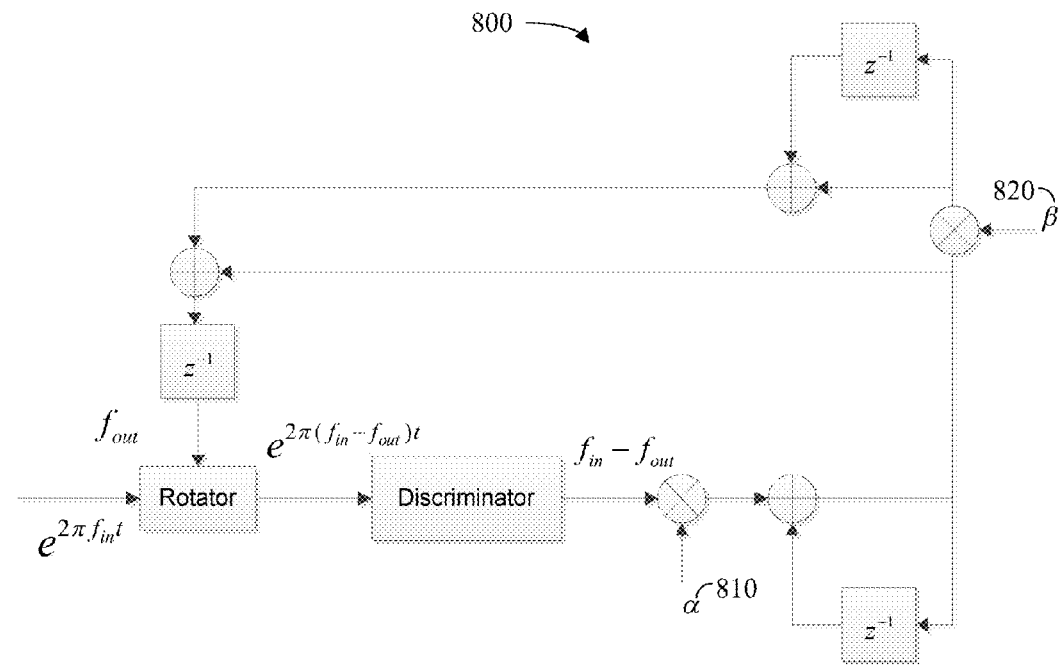
FIG. 8 is a block diagram illustrating a frequency tracking loop according to a second order configuration.

FIG. 8 is a block diagram illustrating a frequency tracking loop 800 according to a second order configuration. A tracking loop speed of the frequency tracking loop 800 is determined by a time constant:

$$\sqrt{1-\alpha} \quad (4)$$

where α is an inner loop gain 810, β is an outer loop gain 820, and the frequency tracking loop 800 is under critical damping when:

$$\beta = \frac{2-\alpha-2\sqrt{1-\alpha}}{\alpha} \quad (5)$$

and a transfer function of the frequency tracking loop 800 is:

$$f_{out} = \frac{\alpha z^{-1}(1-z^{-1}) + \alpha\beta z^{-1}}{1-(2-\alpha-\alpha\beta)z^{-1}+(1-\alpha)z^{-2}} f_{in} \quad (6)$$

Ideally, the tracking loops and channel estimator should be updated as frequently as possible to track time-varying characteristics and achieve better noise suppression. In a time division duplex (TDD) system, however, both uplink and downlink transmissions are carried out in the same band. As a result, a radio frame is divided into uplink subframes and downlink subframes. Because there is no downlink signal coming from the eNodeB during non-downlink (e.g., uplink or special) subframes, a filter coefficient (e.g., loop gains for a frequency/timing tracking loop, an automatic gain control loop or IIR filter coefficients of a channel estimator) update is frozen during non-downlink subframes, such that the loop gains are set to zero. The tracking filter state may not be updated during non-downlink subframes (e.g., by setting the tracking filter coefficients to zero) to keep uplink subframes from the update.

In another aspect of the disclosure, the filter update during a downlink subframe is frozen when an instantaneous SNR (signal to noise ratio) drops below a predetermined threshold. In this aspect of the disclosure, the signal to noise ratio of the subframe is computed according to reference signal (RS) tones within the subframe. This aspect of the disclosure may combat degradation due to deployments in regions with different uplink/downlink configurations.

Because the tracking filter update is frozen during non-downlink subframes or unreliable subframes, a filter tracking speed may slow down in comparison to loops updated every subframe. In one aspect of the disclosure, the filter coefficients are controlled in the good downlink subframes such that a tracking speed of the tracking filters is consistent regardless of whether the filter is updated.

An uplink/downlink subframe pattern varies depending on the uplink/downlink configuration. In LTE-TDD, the same communication spectrum is used for both uplink transmission from the UEs to the eNodeB and for downlink transmission from an eNodeB to the UEs. The uplink and downlink transmissions are orthogonalized in time to coordinate when UEs receive and when they transmit. The different TDD configurations supported in LTE are shown in Table 1 below.

TABLE 1

| UL-DL Config | DL-UL Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As shown in Table 1, D indicates a subframe for downlink (DL) (i.e., eNodeB to UE communication), U indicates a subframe for uplink (UL) (i.e., UE to eNodeB communication), and S indicates a special subframe. A special subframe may include downlink Orthogonal Frequency Division Multiplexed (OFDM) symbols, a guard period, and uplink OFDM symbols.

In FDD/TDD MBSFN mode, some subframes are assigned for multimedia broadcast. In FDD MBSFN mode, the MBSFN subframes can be subframes 1, 2, 3, 6, 7, 8. In TDD MBSFN mode, the MBSFN subframes can be subframes 2, 3, 4, 7, 8, 9. Under an MBSFN scenario, the subframes that are guaranteed to be downlink subframes for a UE receiver would be subframes 0, 4, 5, 9 for FDD and subframes 0, 1, 5, 6 for TDD.

Figure 9:
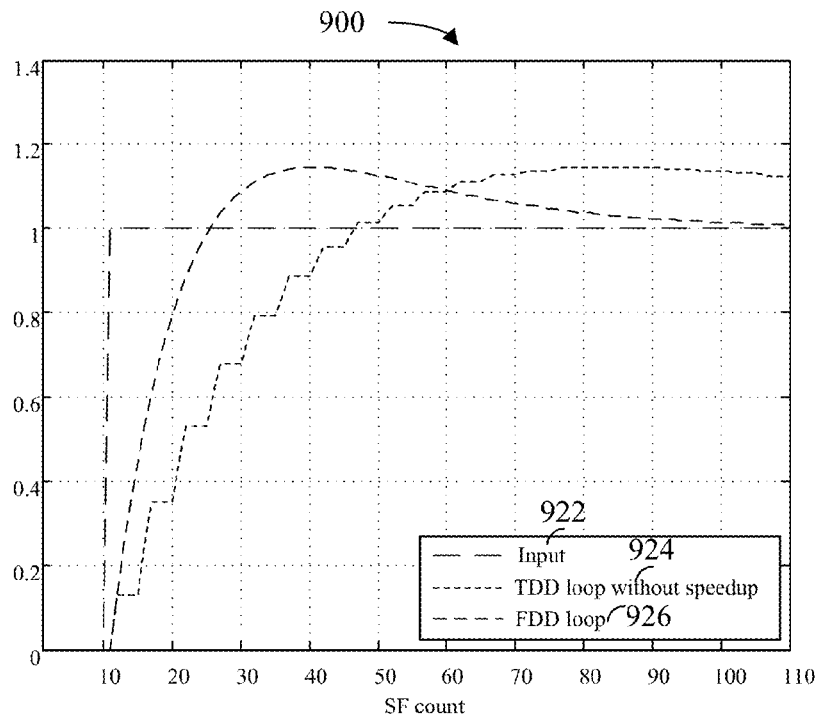
FIG. 9 is a comparison of a second order loop tracking speed for FDD and TDD with a step input.

Freezing of a frequency/timing tracking loop, automatic gain control loop, and a channel estimation loop update during non-downlink subframes is determined according to the LTE-TDD uplink/downlink configuration, as shown in Table 1. FIG. 9 is a graph 900 illustrating loop tracking speeds of a tracking loop having a frozen frequency/timing tracking loop, automatic gain control loop, or a channel estimation loop update during non-downlink subframes. The graph 900 shows an input signal 922, a TDD loop without speedup 924, and an FDD loop 926. The FDD loop 926 is updated every subframe, whereas the TDD loop without speedup 924 is only updated during downlink subframes. Representatively, during non-downlink subframes, the loop gains are frozen (e.g., $(\alpha_{TDD}, \beta_{TDD})=(0,0)$), where α and β refer to the values in the equations (e.g., (1) to (6)) above. Consequently, the loop tracking speed slows down, as illustrated by the TDD loop without speedup 924 because the loop gains are not updated during non-downlink subframes. In FIG. 9, the parameters are a first uplink/downlink configuration (UL_DL_CFG=1) and $(\alpha_{TDD}, \beta_{TDD})=(0.125, 0.0334)$ with a step input.

Figure 10:
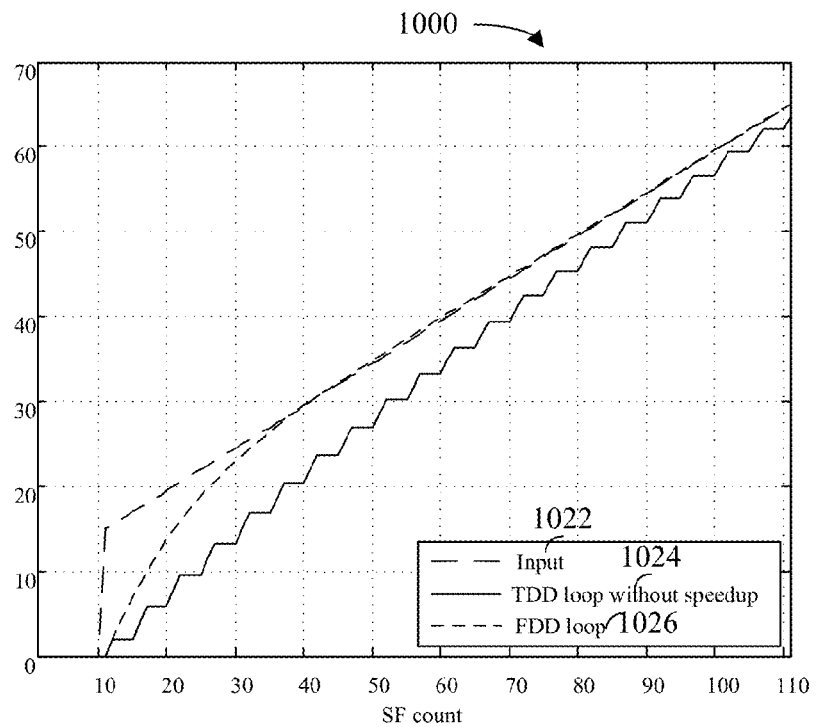
FIG. 10 is a comparison of a second order loop tracking speed for FDD and TDD with a ramp input.

FIG. 10 is a comparison of a second order loop tracking speed for FDD (frequency division duplex) and TDD (time division duplex) with a first uplink/downlink configuration (UL_D_L CFG=1) and $(\alpha_{TDD}, \beta_{TDD})=(0.125, 0.0334)$ with a ramp input, shown by the input signal 1022. Representatively, a graph 1000 shows an input signal 1022, a time division duplex (TDD) loop without speedup 1024, and a frequency division duplex (FDD) loop 1026. Similarly, the loop tracking speed slows down, as illustrated by the TDD loop without speedup 1024 because the loop gains are not updated during non-downlink subframes.

In one aspect of the disclosure, a tracking loop speed is compensated by increasing the loop gains for all downlink subframes by a ratio of the total number of subframes to the number of downlink subframes in one radio frame. In this configuration, $\alpha_{FDD}$ and ($\alpha_{FDD}$, $\beta_{FDD}$) are selected as the first order and second order loop gains under the assumption that the tracking loop is updated every subframe. Based on this configuration, a loop gain (e.g., inner loop) is increased by a ratio of the total number of subframes (e.g., 10 for the LTE standard) to the number of downlink subframes ($N_{DL}$) in one radio frame (e.g., 10/$N_{DL}$). In this configuration, the loop gains are scaled based on an uplink/downlink configuration in a time division duplex system according to a first order loop given by:

$$(1-\alpha_{TDD}) = (1-\alpha_{FDD})^{\frac{10}{N_{DL}}} \quad (7)$$

and a second order loop given by:

$$\sqrt{1-\alpha_{TDD}} = (\sqrt{1-\alpha_{FDD}})^{\frac{10}{N_{DL}}} \quad (8)$$

to provide a scaled loop gain ($\alpha_{TDD}$) as:

$$\alpha_{TDD} = 1 - (1-\alpha_{FDD})^{\frac{10}{N_{DL}}} \quad (9)$$

For a second order loop to ensure critical damping, an outer loop gain is given by:

$$\beta_{TDD} = \frac{2 - \alpha_{TDD} - 2\sqrt{1-\alpha_{TDD}}}{\alpha_{TDD}} \quad (10)$$

In this aspect of the disclosure, the scaled loop gains ($\alpha_{TDD}$, $\beta_{TDD}$) given by equations (9) and (10) are applied to all downlink subframes. Table 2 provides the number of downlink subframes ($N_{DL}$) for each uplink/downlink configuration (UL_DL_cfg).

TABLE 2

| UL_DL_cfg | 0 | 1 | 2 | 3 | 4 | 5 | 6 |
|---|---|---|---|---|---|---|---|
| $N_{DL}$ | 2 | 4 | 6 | 6 | 7 | 8 | 3 |

Figure 11:
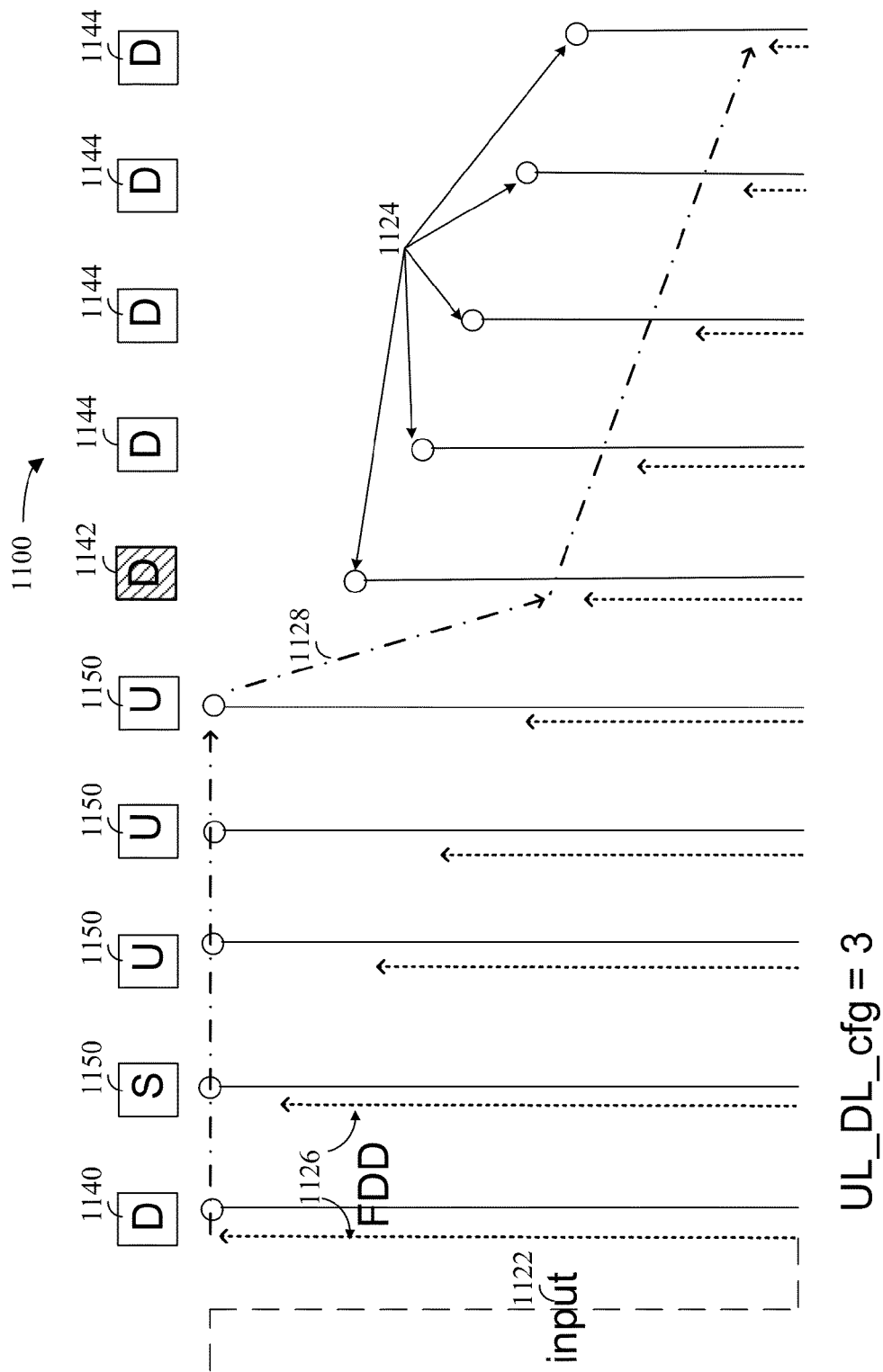
FIG. 11 is a timing diagram illustrating compensation of loop tracking speeds of a tracking loop frozen during non-downlink subframes for an uplink/downlink configuration, according to an aspect of the present disclosure.

In another aspect of the disclosure, the tracking loop speed is compensated by increasing the loop gains for only the uplink to downlink ("transitional") subframe by the number of consecutive non-downlink subframes before the transitional subframe, as shown in FIG. 11.

FIG. 11 illustrates a timing diagram 1100 illustrating compensation of the loop tracking speed of a tracking loop having a frozen control loop update during non-downlink subframes for uplink/downlink configuration 3 (UL_DL_cfg=3). The timing diagram 1100 shows an input signal 1122, a TDD loop signal without speedup 1124, an FDD loop signal 1126, and a TDD loop signal with speedup 1128. The FDD loop signal 1126 is updated every subframe, whereas the TDD loop signal without speedup 1124 is updated during downlink subframes. Representatively, during non-downlink subframes, the loop gains are frozen (e.g. ($\alpha_{TDD}$, $\beta_{TDD}$)=(0,0)). Consequently, the loop tracking speed slows down, as illustrated by the TDD loop signal without speedup 1124.

In one aspect of the disclosure, compensation of the loop tracking speed is achieved by applying scaled loop gains ($\alpha_{TDD}$, $\beta_{TDD}$) given by equations (9) and (10) to the uplink to downlink subframe ("transitional downlink subframe") 1142 by the number of consecutive non-downlink subframes 1150 before the transitional downlink subframe 1142. In this configuration, the loop gains are updated for the downlink subframes 1140 and 1144, whereas the scaled loop gain is applied to the transitional downlink subframe 1142.

In one aspect of the disclosure, the loop gains are increased at the transitional downlink subframe 1142 by the number of consecutive non-downlink subframes 1150, N (before the transitional downlink subframe 1142). In this configuration, the loop gains are scaled based on an uplink/downlink configuration in a time division duplex system according to a first order loop given by:

$$(1-\alpha_{TDD}) = (1-\alpha_{FDD})^N \quad (11)$$

and a second order loop given by:

$$\sqrt{1-\alpha_{TDD}} = (\sqrt{1-\alpha_{FDD}})^N \quad (12)$$

to provide a scaled loop gain ($\alpha_{TDD}$) as:

$$\alpha_{TDD} = 1 - (1-\alpha_{FDD})^N \quad (13)$$

In this aspect of the disclosure, the scaled loop gains ($\alpha_{TDD}$) given by equation (13) are applied to the transitional downlink subframe 1142. In this configuration, the FDD loop gains ($\alpha_{FDD}$, $\beta_{FDD}$) are supplied for subsequent ones of the downlink subframes 1144 (after the transitional downlink subframe 1142).

Figure 12:
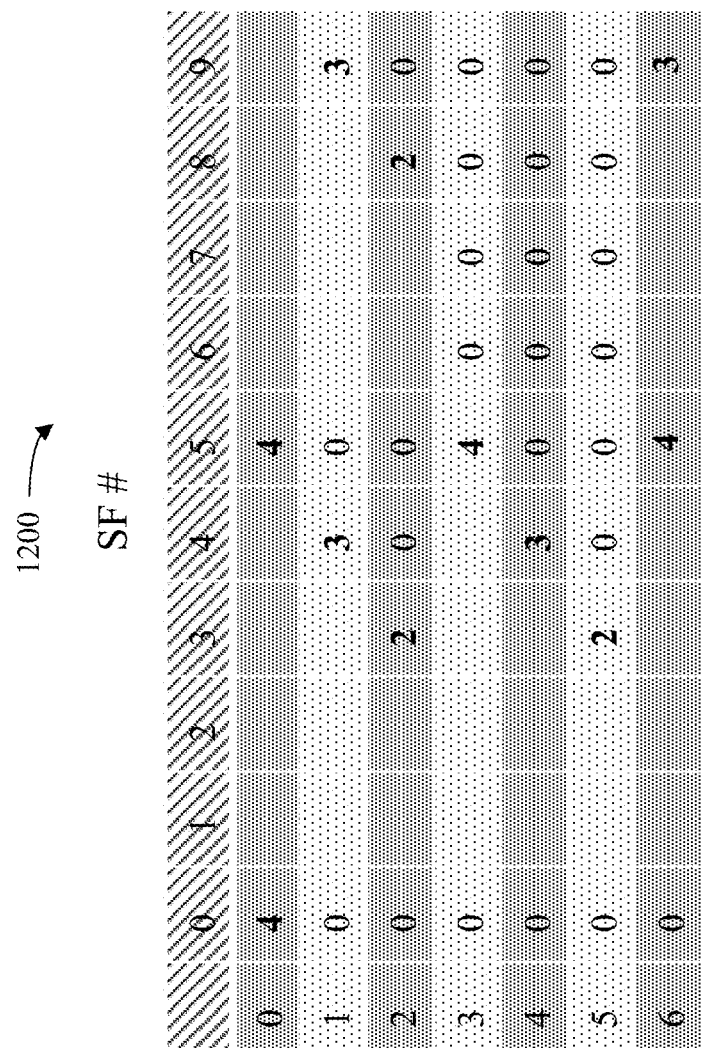
FIG. 12 is a diagram that provides a scaling value for each uplink/downlink configuration (UL_DL_cfg) according to an aspect of the present disclosure.

FIG. 12 illustrates a diagram 1200 that provides a value N for each uplink configuration (UL_DL_cfg) according to an aspect of the present disclosure. Representatively, the N value for computing the scaled loop gains ($\alpha_{TDD}$) according to equation (13) for the transitional subframes are shown in bold.

Figure 13:
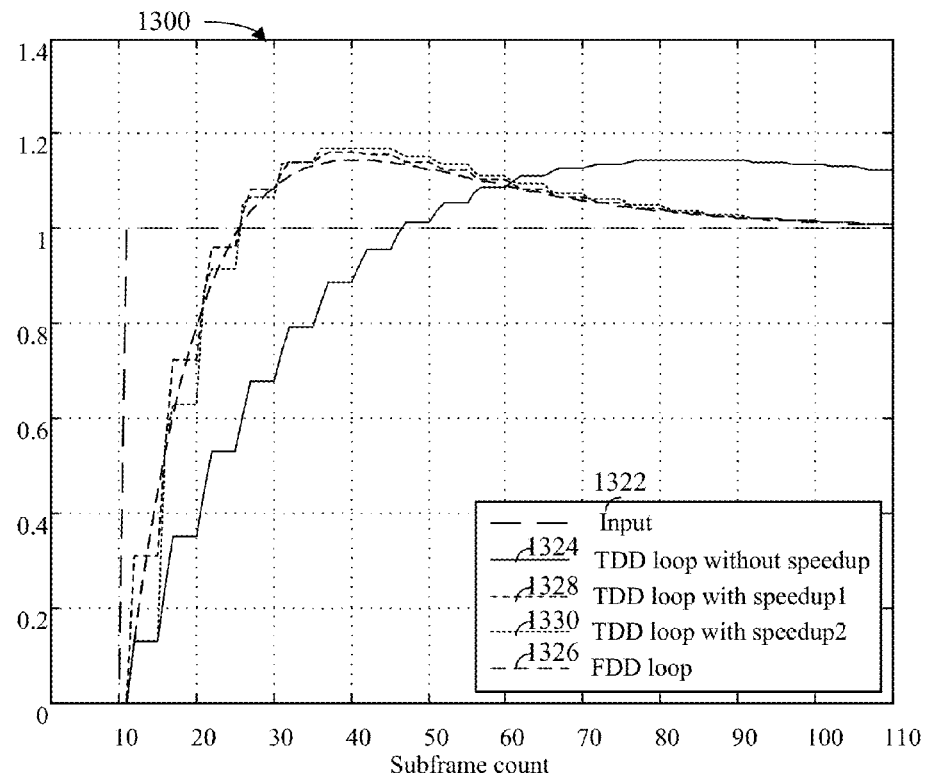
FIG. 13 is a graph illustrating comparison of a second order loop tracking speedup for a TDD system with a step input according to an aspect of the present disclosure.

FIG. 13 is a comparison of loop tracking speeds for FDD (frequency division duplex) and TDD (time division duplex) with a first uplink/downlink configuration (UL_DL_CFG=1) and ($\alpha_{TDD}$, $\beta_{TDD}$)=(0.125, 0.0334) with a step input. Representatively, a graph 1300 shows an input 1322, a TDD loop without speedup 1324, and an FDD loop 1326. Graph 1300 also illustrates a first TDD loop tracking speedup 1328 according to a first configuration and a second TDD loop tracking speedup 1330 according to a second configuration.

Figure 14:
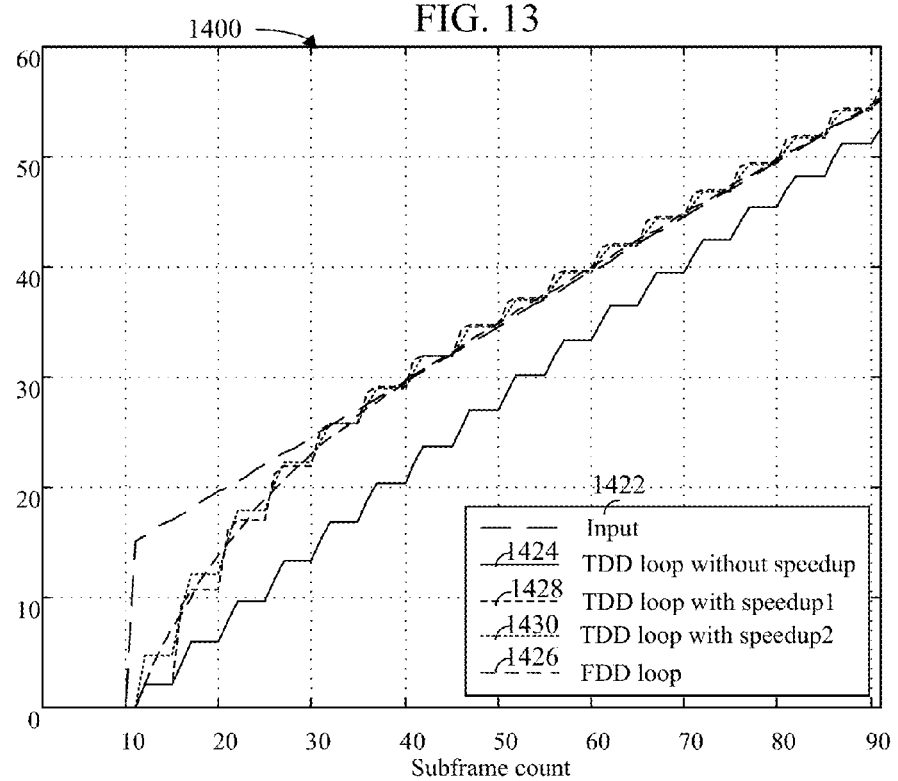
FIG. 14 is a graph illustrating comparison of a second order loop tracking speedup for a TDD system with a ramp input according to an aspect of the present disclosure.

FIG. 14 is a comparison of a second order loop tracking speed for FDD (frequency division duplex) and TDD (time division duplex) with a first uplink/downlink configuration (UL_DL_CFG=1) and ($\alpha_{TDD}$, $\beta_{TDD}$)=(0.125, 0.0334) with a ramp input. Representatively, a graph 1400 shows an input 1422, a TDD loop without speedup 1424, and an FDD loop 1426. The graph 1400 also illustrates a first TDD loop tracking with speedup 1428 according to a first configuration and, a second TDD loop tracking with speedup 1430 according to a second configuration.

Figure 15:
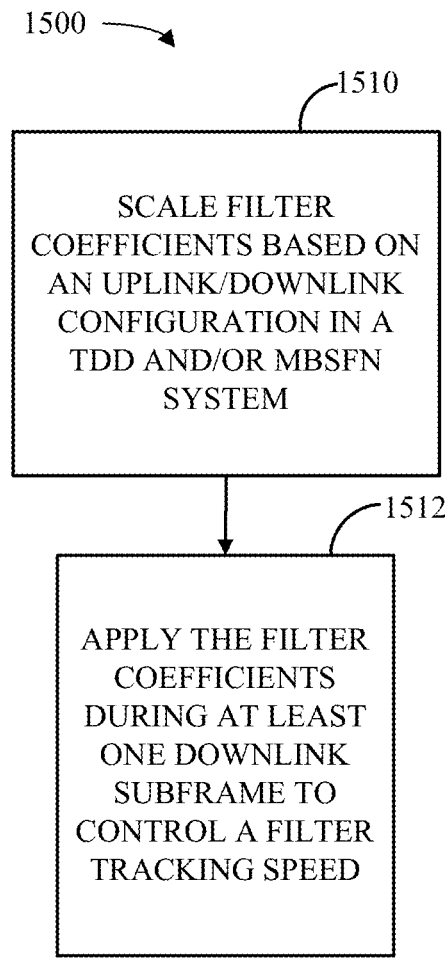
FIG. 15 is a block diagram illustrating a method for speeding up a filter tracking speed according to an aspect of the present application.

FIG. 15 illustrates a method 1500 for a filter tracking speedup that compensates for a frozen filter coefficient update to adjust the slowed loop speed according to an aspect of the present disclosure. As shown in block 1510, filter coefficients are scaled based at least in part on an uplink/downlink configuration in a time division duplex (TDD) or a multimedia broadcast single frequency network (MBSFN) system. In one aspect of the disclosure, the filter coefficients for the TDD/MBSFN system are scaled to approximate filter coefficients for an FDD system, which are updated each subframe. At block 1512, the scaled filter coefficients are applied during at least one downlink subframe to control a filter tracking speed. In one configuration, the scaled filter coefficients are applied for downlink subframes by a ratio of the number of downlink subframes to the total number of subframes in one radio frame. In another configuration, the scaled filter coefficients are applied to the transitional subframe based on the number of consecutive downlink subframes before the transitional subframe.

Figure 16:
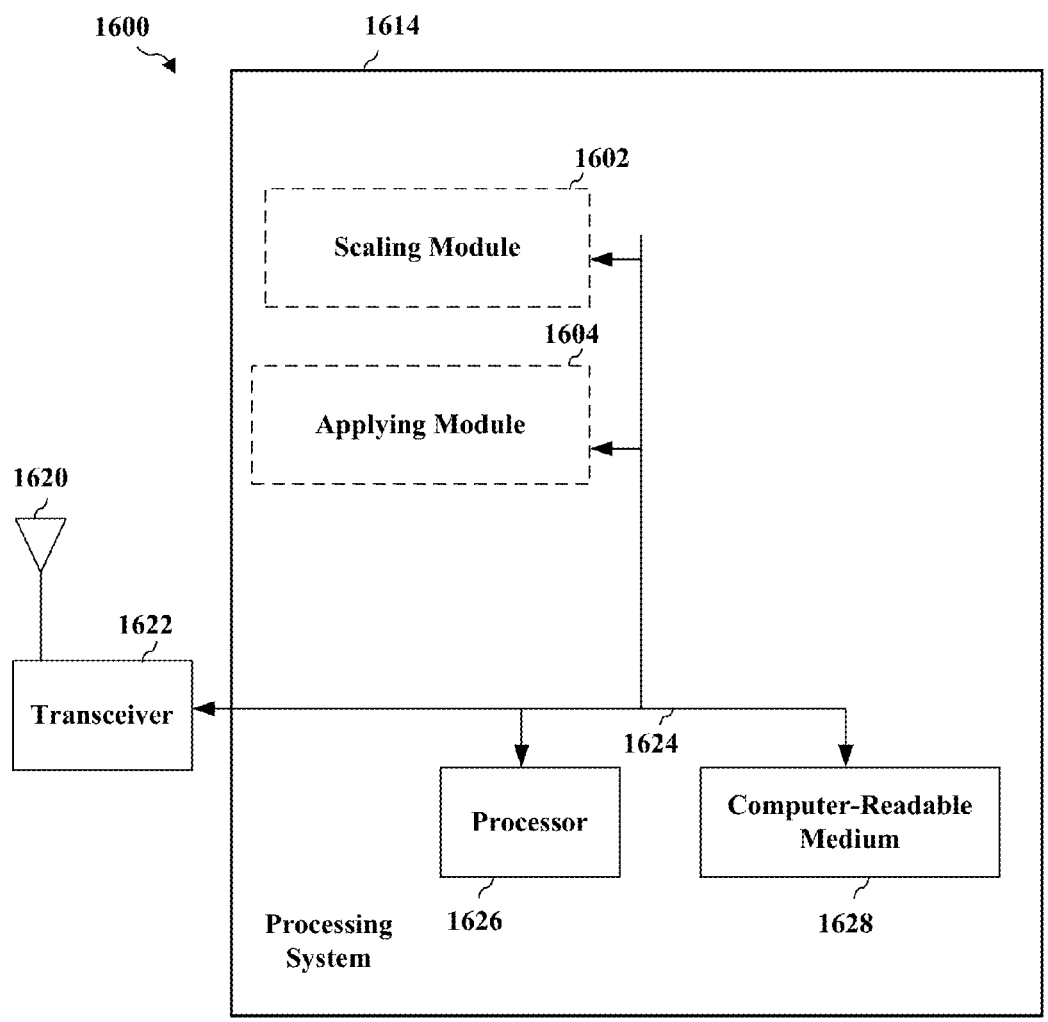
FIG. 16 is a diagram illustrating an example of a hardware implementation for an apparatus employing a filter tracking loop speedup system according to an aspect of the present disclosure.

FIG. 16 is a diagram illustrating an example of a hardware implementation for an apparatus 1600 employing a filter tracking speedup system 1614. The filter tracking speedup system 1614 may be implemented with a bus architecture, represented generally by a bus 1624. The bus 1624 may include any number of interconnecting buses and bridges depending on the specific application of the filter tracking speedup system 1614 and the overall design constraints. The bus 1624 links together various circuits including one or more processors or hardware modules, represented by a processor 1626, a scaling module 1602, an applying module 1604, and a computer-readable medium 1628. The bus 1624 may also link various other circuits such as timing sources, peripherals, voltage regulators, and power management circuits, which are well known in the art, and therefore, will not be described any further.

The apparatus includes the filter tracking speedup system 1614 coupled to a transceiver 1622. The transceiver 1622 is coupled to one or more antennas 1620. The transceiver 1622 provides a means for communicating with various other apparatus over a transmission medium. The filter tracking speedup system 1614 includes the processor 1626 coupled to the computer-readable medium 1628. The processor 1626 is, e.g., responsible for general processing, including the execution of software stored on the computer-readable medium 1628. The software, when executed by the processor 1626, causes the filter tracking speedup system 1614 to perform the various functions described for any particular apparatus. The computer-readable medium 1628 may also be used for storing data that is manipulated by the processor 1626 when executing software.

The filter tracking speedup system 1614 further includes the scaling module 1602 for scaling filter coefficients based at least in part on an uplink/downlink configuration in a time division duplex (TDD) or a multimedia broadcast single frequency network (MBSFN) system. The filter tracking speedup system 1614 also has an applying module 1604 for applying the filter coefficients during at least one downlink subframe to control a filter tracking speed. The scaling module 1602 and the applying module 1604 may be software modules running in the processor 1626, resident/stored in the computer-readable medium 1628, one or more hardware modules coupled to the processor 1626, or some combination thereof. The filter tracking speedup system 1614 may be a component of the UE 650 and may include the memory 662 or the controller/processor 660.

In one configuration, the apparatus 1600 for wireless communication includes means for scaling and means for applying. The means may be the scaling module 1602, the applying module 1604 or the filter tracking speedup system 1614 of the apparatus 1600 configured to perform the functions recited by the scaling means and the applying means. The scaling means may include antenna 652, receive processor 656, controller/processor 660, or memory 662. The applying means may include the receive processor 656, the controller/processor 660, or memory 662. In another aspect, the aforementioned means may be any module or any apparatus configured to perform the functions recited by the aforementioned means.

The examples describe aspects implemented in an LTE system. However, the scope of the disclosure is not so limited. Various aspects may be adapted for use with other communication systems, such as those that employ any of a variety of communication protocols including, but not limited to, CDMA systems, TDMA systems, FDMA systems, and OFDMA systems.

Those of skill would further appreciate that the various illustrative logical blocks, modules, circuits, and algorithm steps described in connection with the disclosure herein may be implemented as hardware, software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, PCM (phase change memory), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, or combinations thereof. If implemented in software, the functions may be stored on, encoded as one or more instructions or code on, or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, comprising:
   scaling filter coefficients of a frequency tracking loop, a time tracking loop, or an automatic gain control loop, at a user equipment (UE), by increasing the filter coefficients by a ratio of a total number of subframes to a number of downlink subframes in one radio frame based at least in part on an uplink/downlink configuration in a time division duplex (TDD) or a multimedia broadcast single frequency network (MBSFN) system; and
   applying the scaled filter coefficients during at least one downlink subframe to control a filter tracking speed.

2. The method of claim 1,
   in which the applying comprises applying the scaled filter coefficients for all downlink subframes in the one radio frame.

3. The method of claim 1, in which the applying comprises increasing the scaled filter coefficients only for a transitional downlink subframe, which immediately follows an uplink subframe, by a number of consecutive non-downlink subframes preceding the transitional downlink subframe.

4. The method of claim 3, in which filter coefficients for a frequency division duplex (FDD) system are applied to the at least one downlink subframe following the transitional downlink subframe.

5. The method of claim 1, further comprising:
   deactivating an update of the scaled filter coefficients during non-downlink subframes.

6. The method of claim 1, further comprising:
   deactivating an update of the scaled filter coefficients when a signal to noise ratio of a subframe is below a predetermined threshold.

7. The method of claim 6, further comprising:
   computing the signal to noise ratio of the subframe according to reference signal tones within the subframe.

8. An apparatus configured for operation in a wireless communication network, the apparatus comprising:
   a memory; and
   at least one processor coupled to the memory, the at least one processor configured to:
      scale filter coefficients of a frequency tracking loop, a time tracking loop, or an automatic gain control loop, at a user equipment (UE), by increasing the filter coefficients by a ratio of a total number of subframes to a number of downlink subframes in one radio frame based at least in part on an uplink/downlink configuration in a time division duplex (TDD) or a multimedia broadcast single frequency network (MBSFN) system; and
      apply the scaled filter coefficients during at least one downlink subframe to control a tracking loop speed.

9. The apparatus of claim 8, in which the at least one processor is further configured to:
   apply the scaled filter coefficients for all downlink subframes in the one radio frame.

10. The apparatus of claim 8, in which the at least one processor is further configured to apply the filter coefficients by increasing the scaled filter coefficients only for a transitional downlink subframe, which immediately follows an uplink subframe, by a number of consecutive non-downlink subframes preceding the transitional downlink subframe.

11. The apparatus of claim 10, in which the at least one processor is further configured to apply the filter coefficients for a frequency division duplex (FDD) system to the at least one downlink subframe following the transitional downlink subframe.

12. The apparatus of claim 8, in which the at least one processor is further configured to deactivate an update of the filter coefficients during non-downlink subframes.

13. The apparatus of claim 8, in which the at least one processor is further configured to deactivate an update of the filter coefficients when a signal to noise ratio of a subframe is below a predetermined threshold.

14. A computer program product configured for wireless communication, the computer program product comprising:
   a non-transitory computer-readable medium having program code recorded thereon, the program code comprising:
      program code to scale filter coefficients of a frequency tracking loop, a time tracking loop, or an automatic gain control loop, at a user equipment (UE), by increasing the filter coefficients by a ratio of a total number of subframes to a number of downlink subframes in one radio frame based at least in part on an uplink/downlink configuration in a time division duplex (TDD) or a multimedia broadcast single frequency network (MBSFN) system; and
      program code to apply the scaled filter coefficients during at least one downlink subframe to control a filter tracking speed.

15. An apparatus operable in a wireless communication system, the apparatus comprising:
   means for scaling filter coefficients of a frequency tracking loop, a time tracking loop, or an automatic gain control loop, at a user equipment (UE), by increasing the filter coefficients by a ratio of a total number of subframes to a number of downlink subframes in one radio frame based at least in part on an uplink/downlink configuration in a time division duplex (TDD) or a multimedia broadcast single frequency network (MBSFN) system; and
   means for applying the scaled filter coefficients during at least one downlink subframe to control a tracking loop speed.

16. The apparatus of claim 15,
   in which the means for applying further comprises means for applying the scaled filter coefficients for all downlink subframes in the one radio frame.

17. The apparatus of claim 15, in which the means for applying comprises means for increasing the scaled filter coefficients only for a transitional downlink subframe, which immediately follows an uplink subframe, by a number of consecutive non-downlink subframes preceding the transitional downlink subframe.

18. The apparatus of claim 17, further comprising means for applying filter coefficients for a frequency division duplex (FDD) system to the at least one downlink subframe following the transitional downlink subframe.

* * * * *